(12) United States Patent
Petzel

(10) Patent No.: US 7,621,596 B2
(45) Date of Patent: Nov. 24, 2009

(54) LUMBAR SUPPORT

(75) Inventor: Jan Petzel, Tuebingen (DE)

(73) Assignee: Schukra Geraetebau AG, Berndorf (AT)

( * ) Notice: Subject to any disclaimer, the term of this patent is extended or adjusted under 35 U.S.C. 154(b) by 0 days.

(21) Appl. No.: 12/096,861

(22) PCT Filed: Jan. 11, 2007

(86) PCT No.: PCT/EP2007/000223

§ 371 (c)(1),
(2), (4) Date: Jul. 18, 2008

(87) PCT Pub. No.: WO2007/082682

PCT Pub. Date: Jul. 26, 2007

(65) Prior Publication Data

US 2008/0277985 A1    Nov. 13, 2008

(30) Foreign Application Priority Data

Jan. 17, 2006    (DE) ...................... 10 2006 002 230

(51) Int. Cl.
*B60N 2/66*    (2006.01)
(52) U.S. Cl. .................................. 297/284.6
(58) Field of Classification Search ............. 297/284.3, 297/284.6; 5/633, 644, 654, 655.3
See application file for complete search history.

(56) References Cited

U.S. PATENT DOCUMENTS

| | | | | |
|---|---|---|---|---|
| 2,987,114 A | * | 6/1961 | Klepper | ........................... 5/654 |
| 3,297,023 A | * | 1/1967 | Foley | .......................... 601/148 |
| 3,330,598 A | * | 7/1967 | Whiteside | ................. 297/284.3 |
| 4,699,424 A | | 10/1987 | Andres et al. | |
| 4,759,543 A | * | 7/1988 | Feldman | ...................... 482/148 |
| 4,777,679 A | * | 10/1988 | DeLooper | .................... 5/655.3 |
| 4,807,931 A | | 2/1989 | Ishida et al. | |
| 4,840,425 A | * | 6/1989 | Noble | ...................... 297/284.1 |
| 5,396,671 A | * | 3/1995 | Stacy | ........................... 5/655.3 |
| 5,678,891 A | * | 10/1997 | O'Neill et al. | ........... 297/284.6 |
| 5,860,699 A | * | 1/1999 | Weeks | ...................... 297/284.6 |
| 6,129,419 A | * | 10/2000 | Neale | ...................... 297/284.4 |
| 6,299,250 B1 | | 10/2001 | Orizaris et al. | |

FOREIGN PATENT DOCUMENTS

| | | |
|---|---|---|
| DE | 35 37 846 | 5/1978 |
| DE | 35 21 908 | 1/1986 |
| DE | 41 06 862 | 9/1992 |
| DE | 199 34 472 | 2/2001 |
| DE | 100 63 478 | 7/2002 |
| WO | WO 98/58566 | 12/1998 |

OTHER PUBLICATIONS

International Search Report and Written Opinion of the International Searching Authority, PCT/EP2007/000223, mailed Apr. 2, 2007.

* cited by examiner

*Primary Examiner*—Peter R. Brown
(74) *Attorney, Agent, or Firm*—Michael Best & Friedrich LLP

(57) ABSTRACT

The invention relates to a lumbar support comprising a plurality of pneumatically operated chambers (11-14) for adjusting the curvature of a seat back, wherein the lumbar support comprises two outer chambers (11, 12) and two central chambers (13, 14) in the longitudinal direction of the seat back, wherein the two central chambers (13, 14) are arranged over one another perpendicularly to the longitudinal direction of the seat back between the two outer chambers, wherein each outer chamber has an air connection to one of the two central chambers.

10 Claims, 1 Drawing Sheet

LUMBAR SUPPORT

This application is a U.S. national phase application filing of International Patent Application No. PCT/EP2007/000223, filed Jan. 11, 2007, which claims priority to German Patent Application No. 10 2006 002 230.09, filed Jan. 17, 2006. The entire Contents of each of the foregoing applications are incorporated herein by reference.

The present invention relates to a lumbar support comprising a plurality of pneumatically operated chambers for adjusting the curvature of a seat back.

Such lumbar supports are used, for example, in the back rests of motor vehicle seats. In such cases, the lumbar support has multiple supporting functions, since both the lower spinal column region, i.e. the lumbar or lordosis region, and the central spinal column region and the upper spinal column region have to be adequately supported in order reliably to prevent signs of fatigue during relatively long periods of sitting and any possible damage to health. For this reason, it is extremely important to use lumbar supports with an adjustable arch or curvature in order to be able to adapt the apex of the curve to the individual requirements of the particular person sitting in the seat. However, this does not only apply to lumbar supports in motor vehicle seats, but also to the back rests of seats of any type, for example office chairs.

Such lumbar supports may be actuated, for example, by a four-way control element such as a four-way toggle switch. Such a four-way control element may be used to activate a lumbar support with two pneumatically operated chambers. These two chambers conventionally lie along the longitudinal direction of the back rest. By inflating the lower or upper chamber, a lower or higher curve apex may be achieved. However, if both chambers are inflated, no satisfactory geometry is achieved. If more than two pneumatically operated chambers are used, electronic control of the air pressure in the individual chambers is necessary, since for example three or more chambers can no longer be completely controlled with the conventionally provided four-way control element. Furthermore, it is also possible to control systems with more than three chambers with a control element for each chamber. However, for this purpose it is necessary to fit a plurality of control elements to the seat. Simple operation of the lumbar support is then no longer possible.

The object of the present invention is the provision of a lumbar support with a maximally variable curve apex, wherein control of the lumbar support should be possible with the simplest possible control element.

This object is achieved with the features of the independent claims. The dependent claims describe preferred embodiments of the invention.

In a first aspect, the invention relates to a lumbar support which comprises a plurality of pneumatically operated chambers for adjusting the curvature of a seat back. The lumbar support according to the invention preferably comprises first chambers, which each have an air supply line for changing the air pressure in the particular chamber. Furthermore, second chambers are provided, which each have a connection to a first chamber to change the air pressure in the chamber, wherein the chambers are arranged with partial overlap over the longitudinal direction of the seat back. As a result of the fact that some of the chambers have an air supply line while others of the chambers do not have their own air supply line but rather are connected with the first chambers, which do have an air supply line, the number of air supply lines may be restricted, so simplifying the construction of the control element for the air supply lines. As will be explained below, the partially overlapping arrangement of the individual chambers makes possible variable adjustment of the lumbar support. For the purposes of the present invention, a chamber with air supply means that this chamber may be fed directly with compressed air. The other chambers (second chambers) naturally also have compressed air fed to them, but this compressed air is supplied via the air connection with a first chamber. The second chambers are accordingly not fed directly with compressed air, but rather are supplied with compressed air via the first chambers.

According to a further preferred embodiment, the lumbar support comprises two first and two second chambers, wherein the two second chambers overlap one another. In the longitudinal direction of the seat back, the lumbar support according to the invention may comprise two outer first chambers and two central second chambers, wherein the two central chambers are arranged over one another perpendicularly to the longitudinal direction of the seat plane between the two outer chambers, wherein each outer chamber has an air connection with one of the two central chambers. Such an arrangement allows for very variable adjustment of the curve apex of the lumbar support. Likewise, height adjustment of the curve apex is possible over a relatively large vertical range. As a result of the fact that each outer chamber has an air connection to one of the two central chambers, air supply lines need only be provided for the outer chambers. These two air supply lines may then be actuated with a conventional four-way switch. Thus, the lumbar support according to the invention may be installed in any vehicle seat, no separate device for control of the individual chambers being necessary.

The one outer first chamber preferably has an air connection to one of the two central chambers, while the other outer first chamber has an air connection to the other of the two central chambers. If one of the two outer chambers is fed with compressed air, in each case one of the two central chambers is also filled with air.

When fed with compressed air, the two central (second) chambers preferably each exhibit a smaller width in the direction of curvature of the seat back than the two outer chambers. This means that, in the completely filled state, the two outer chambers extend further perpendicularly to the seat back than each individual central chamber.

According to a further preferred embodiment, the lumbar support is attached to a supporting structure of the seat back by means of straps attached to the two central chambers. This means that the lumbar support is attached to the seat back only via the central chambers, the outer chambers merely being coupled to the central chambers.

Furthermore, at least two, preferably three straps may preferably be attached to each central chamber, wherein these at least two straps associated with a chamber pass around one of the two outer chambers, so holding the outer chamber in position. The straps attached to a central chamber preferably lie against the one side face and pass over the other side face of the outer chamber. The other central chamber likewise comprises at least two, preferably three straps, which each pass around the other outer chamber.

Preferably, the two central chambers are of wedge-shaped construction when filled with air, wherein the wedge shape extends in the longitudinal direction of the seat back. Preferably the tip of the wedge of the one central chamber points upwards, while the tip of the wedge of the other central chamber points downwards. When filled with air, the tip of the wedge may come into being, for example, in that the straps are attached to the side edge of the central chamber at which the wedge tip is located. By attaching the straps, the geometry of the chamber in the inflated state is influenced and restricted, wherein the part of the strap which is attached to the chamber acts as a shaping rib for the chamber.

Furthermore, two air supply lines are preferably provided, a first to the one outer chamber and a second to the other outer chamber. If the one chamber is fed with compressed air, the central chamber connected with this outer chamber will also be fed with compressed air, since the two chambers are connected for air supply.

According to a further embodiment according to the invention, the two central chambers are so constructed that, when completely filled with air, they together extend further in the transverse direction than the two outer chambers. If both central chambers are filled with compressed air, then both the outer chambers are also filled with compressed air. In order to position the curve apex in the middle of the lumbar support, the two central chambers project further, in the filled state, than the two outer chambers respectively above and below the two central chambers.

According to a further preferred embodiment, the air supply to the two outer chambers is controlled via a four-way control element. Control may be effected as follows, for example: on movement of the control element in the first direction, both the two outer chambers are fed with compressed air, on movement in the second direction the compressed air is removed from both chambers. On movement in the third direction, for example the first outer chamber is fed with compressed air, while the other outer chamber is not fed with compressed air, or any compressed air present is removed from this other chamber, while, on movement of the control element in the fourth direction, the other outer chamber may be fed with compressed air while the first outer chamber is not fed with compressed air or compressed air is drawn off.

The invention is explained in more detail below with reference to the attached drawings, in which.

Figure 1:
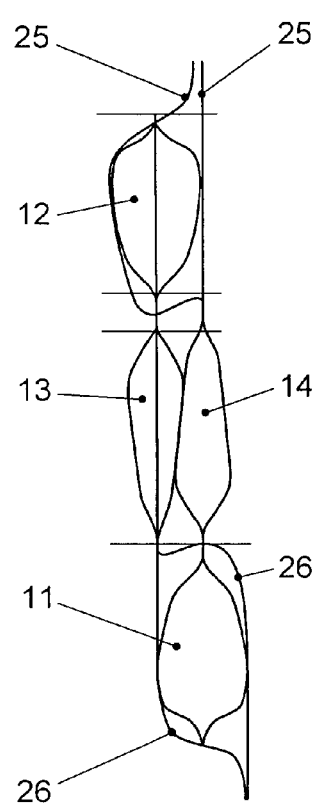
FIG. 1 is a side view of the lumbar support according to the invention.

As shown in FIG. 1, the lumbar support comprises two outer, pneumatically operated first chambers 11 and 12, these being a lower chamber 11 and an upper chamber 12. The two outer chambers 11 and 12 each have air connections to one of the two central second chambers 13, 14, which are positioned over one another perpendicularly to the longitudinal direction of the lumbar support. As is shown, inter alia, in FIG. 2, in each case the lower chamber 11 and the upper chamber 12 comprises an air supply line 21 and 22 respectively, with which the supply of air to or its removal from the chambers 11 and 12 is controlled. In the representation shown in FIG. 2, the chamber 11 is connected for air supply to the chamber 14 via a connection 23. Likewise, the chamber 12 comprises an air connection, not shown, to the chamber 13. If the chamber 12 is then fed with compressed air via the air supply line 22, the chamber 12 fills with compressed air. The chamber 13 is likewise fed with compressed air via the air connection thereto.

The two central chambers 13 and 14 are attached to a supporting structure, not shown, of the seat back via straps 25 and 26. In the embodiment illustrated, each central chamber comprises three fastening straps. These three fastening straps 25 or 26 are each passed around one of the two outer chambers 12 or 11 respectively and hold the outer chambers 12 and 11 in position. In the illustration shown in FIG. 1, the straps 25 and 26 can likewise clearly be seen to pass around the upper or lower chamber respectively.

As is clear from FIG. 1, the two central chambers are of substantially wedge-shaped construction when filled, wherein the wedge tip is located at the edge of the chamber at which the straps are also attached to the chamber. The ends of the straps 25 and 26 attached to the central chambers act as ribs, which influence and establish the shape of the chambers 13 and 14 in the inflated state. As is clear from FIG. 1, the wedge tip of the chamber 14 points upwards, wherein the chamber 14 is connected at this end with the straps 25, while the wedge tip of the chamber 13 points downwards, wherein the straps 26 are attached to this tip or edge of the chamber 13.

Figure 2:
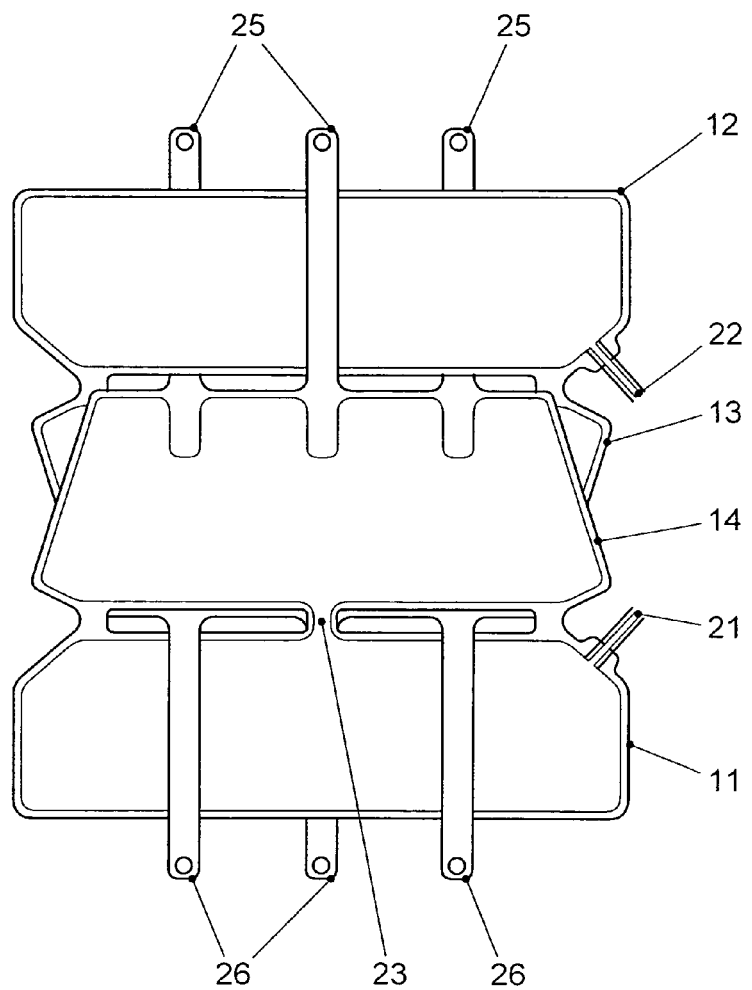
FIG. 2 is a front view of the lumbar support according to the invention.

In the embodiment illustrated in FIGS. 1 and 2, the apex of the lumbar support may be variably adjusted. If only the upper chamber is fed with compressed air, the curve apex is located at the level of the upper chamber 12. In this situation, the chamber 13 is not filled with air, while the chamber 14 is partially or completely filled. In another curvature, only the chamber 11 is fed with compressed air, while the compressed air is removed from the chamber 12. In this situation, the chamber 14 is also provided with compressed air, while the chamber 13 is without compressed air. In this embodiment, the curve apex is at the level of the lower chamber 11. If both chambers are then filled with compressed air, the two central chambers 13 and 14 are so constructed that the curve apex is at the level of the two central chambers 13 and 14. As is clear from the above-stated description, it is possible with the lumbar support according to the invention to achieve a curve apex which is located at the level of chamber 12, chamber 11 or chambers 13 or 14. Moreover, these different individual settings may be brought about by means of a single four-way control element, whereby the above-described lumbar support may be installed in any commercially available vehicle seat. The present invention has better pressure distribution than a conventional two-chamber system, which may be controlled with a similar control element. Furthermore, the curve apex may be displaced vertically by a larger amount than with conventional two chamber systems.

The invention claimed is:

1. A lumbar support for adjusting a curvature of a seat back having a longitudinal extent, the lumbar support comprising:
   a plurality of pneumatic chambers including:
      a plurality of outer first chambers, each first chamber defining an air flow opening for changing an air pressure in the corresponding first chamber,
      a plurality of central second chambers positioned between the outer chambers and positioned over one another in a direction perpendicular to the longitudinal extent of the seat back, each second chamber fluidly communicating with one of the first chambers for changing an air pressure in the corresponding second chamber,
   wherein each of the plurality of outer first chambers does not overlap with any other chamber in the direction perpendicular to the longitudinal extent of the seat back.

2. The lumbar support of claim 1, wherein the plurality of pneumatic chambers includes two first chambers and two second chambers.

3. The lumbar support of claim 2, wherein the two second chambers together extend further in a direction perpendicular to the longitudinal extent of the seat back than the two first chambers when the first and second chambers are substantially completely filled with air.

4. The lumbar support of claim 1, wherein the lumbar support is attached to a supporting structure of the seat back by straps coupled to the central chambers.

5. The lumbar support of claim 4, wherein at least two straps are coupled to each central chamber, and wherein each strap extends along one of the outer chambers to hold the outer chamber in position relative to the seat back.

6. The lumbar support of claim 1, wherein the second chambers are substantially wedge-shaped.

7. The lumbar support of claim 6, wherein each second chamber includes a tip, and wherein straps extend from the tips for coupling of the lumbar support to a supporting structure of the seat back.

8. The lumbar support of claim 1, wherein the plurality of outer first chambers includes an upper first chamber and a lower first chamber, the lumbar support further comprising a first air supply coupled to the air flow opening of the upper first chamber, and a second air supply coupled to the air flow opening of the lower first chamber.

9. The lumbar support of claim 8, wherein the first and second air supplies are controlled by a four-way control element.

10. The lumbar support of claim 8, wherein an apex of curvature of the seat back is adjustable along the longitudinal extent of the seat back between a level of the upper first chamber and a level of the lower first chamber by changing amounts of air provided by the first and second air supplies.

* * * * *